United States Patent [19]

Tran et al.

[11] Patent Number: 5,661,616
[45] Date of Patent: Aug. 26, 1997

[54] TRACK SERVO CONTROL METHOD FOR DATA CARTRIDGE TAPE DRIVES

[75] Inventors: Hung T. Tran, Woodbury; George L. Chavez, Jr., Cottage Grove; Robert J. Youngquist, White Bear Lake, all of Minn.

[73] Assignee: Imation Corp., St. Paul, Minn.

[21] Appl. No.: 394,060

[22] Filed: Feb. 24, 1995

Related U.S. Application Data

[63] Continuation of Ser. No. 3,141, Jan. 12, 1993, abandoned.

[51] Int. Cl.$^6$ .................................................... G11B 5/584
[52] U.S. Cl. ................................. 360/77.12; 360/78.02
[58] Field of Search ........................... 360/77.12, 78.02, 360/78.14, 77.01, 77.16, 78.05, 75

[56] References Cited

U.S. PATENT DOCUMENTS

| | | | |
|---|---|---|---|
| 3,692,255 | 9/1972 | Von Behren . | |
| 4,313,143 | 1/1982 | Zarr . | |
| 4,422,111 | 12/1983 | Moeller et al. | 360/72.1 |
| 4,476,503 | 10/1984 | Solhjell | 360/75 |
| 4,736,353 | 4/1988 | Kasai | 360/78.05 |
| 4,750,067 | 6/1988 | Gerfast . | |
| 4,786,984 | 11/1988 | Seeman | 360/78.02 X |
| 4,802,030 | 1/1989 | Henry et al. | 360/77.12 X |
| 4,996,609 | 2/1991 | Joannou | 360/77.01 X |
| 5,191,492 | 3/1993 | Nayak et al. | 360/77.12 |
| 5,229,895 | 7/1993 | Schwarz et al. | 360/77.12 |
| 5,249,168 | 9/1993 | Rajami et al. | 360/78.14 |
| 5,379,170 | 1/1995 | Schwarz | 360/78.02 X |
| 5,452,153 | 9/1995 | Baheri et al. | 360/78.02 X |

FOREIGN PATENT DOCUMENTS

| | | |
|---|---|---|
| 0 443 810 | 8/1991 | European Pat. Off. . |
| 0 529 930 A1 | 3/1993 | European Pat. Off. . |
| 42 16 896 | 11/1992 | Germany . |

OTHER PUBLICATIONS

IBM Technical Disclosure Bulletin, vol. 20, No. 5, pp. 1792–1794 (Oct. 1977).

Floppy–Disk (6), Chip, No. 10, p. 114 et. seq., Oct. 1981 (translation enclosed).

CD–Player und R–DAT–Recorder, Wiebke, 1988, pp. 138–140 (translation enclosed).

AN 91–399799, Anonymous, "Dedicated Track Servo for Precision".

"Head Location" Nov. 10, 1991, Abstract (Derwent Publications Ltd.).

*Primary Examiner*—Aristotelis M. Psitos
*Assistant Examiner*—James L. Habermehl
*Attorney, Agent, or Firm*—Charles L. Dennis, II

[57] ABSTRACT

A track control method for a data cartridge tape drive which includes a multichannel head assembly, a positioner for controllably positioning the multichannel head assembly transversely to a transport path for a tape driven by the drive, and drive electronics responsive to a carrier servo signal. The track control method initializes the data cartridge tape drive by operating the positioner to move the head assembly to a preselected transverse position. Next, the tape is moved along the transport path and the positioner is moved to substantially minimize a feedback signal derived from the carrier servo signal. The head assembly is stepped a first predetermined number of steps in a first transverse direction until the carrier servo signal is not detected. If the carrier servo signal is not detected, then the positioner is stepped so as to move the head assembly a second predetermined number of steps in a second transverse direction to locate a reference track.

13 Claims, 5 Drawing Sheets

TRACK SERVO CONTROL METHOD FOR DATA CARTRIDGE TAPE DRIVES

This is a continuation of application Ser. No. 08/003,141 filed Jan. 12, 1993, now abandoned.

The present invention relates to data cartridge tape drives and, more particularly, to a track servo control method for data cartridge tape drives using a positioning mechanism for multichannel heads responsive to a pre-recorded servo signal on a data cartridge tape.

BACKGROUND OF THE INVENTION

Data recording cartridges and recorders adapted for their use are disclosed and claimed in U.S. Pat. No. 3,692,255 (von Behren). The cartridge there disclosed includes an enclosure together with an endless flexible belt in frictional contact with the tape on both reel hubs for bi-directionally driving the tape. The cartridge can operate to drive the tape with rapid accelerations and decelerations, such as are encountered in digital data recording and playback. Recorders adapted to use such data cartridges originally employed fixed, multi-track heads which were complex, expensive and difficult to maintain in proper alignment.

To eliminate the multi-track heads, U.S. Pat. No. 4,313,143 (Zarr) disclosed a head positioning mechanism by which a single track head could be transversely positioned with respect to the width of the recording tape to enable recording and playback of any of a plurality of parallel tracks.

U.S. Pat. No. 4,750,067 (Gerfast) discloses a head positioning mechanism for a multi-track data cartridge recorder, including a stepper motor, a lead screw driven by the stepper motor, and a head mounting slide engaged with the lead screw by a partial female thread. The Gerfast mechanism moves a record/playback head transversely to the path of a magnetic recording tape. While the Gerfast mechanism works satisfactorily for some applications, an on-going desire to increase the areal recording density by providing more, narrower tracks has resulted in a need for a mechanism which more accurately positions a magnetic record/read head on the center of a selected track in response to servo signals derived from servo information carried on certain tracks on a multi-track tape.

Most prior art data cartridge tape drives use stepper motors to perform track-follow or track-seek functions. The step size of such a stepper motor is typically large, and the step response is slower than, for example, a voice coil actuator as employed by the present invention. Such relatively large steps necessarily restrict track density. The present invention, through the use of a voice coil actuator, enables one to access high track density formats.

SUMMARY OF THE INVENTION

The present invention is intended for use with a tape such as may be included within a data cartridge having previously recorded thereon a plurality of servo tracks within a designated servo band or section, other portions of the tape extending parallel to the servo section being designated to contain user data. Upon playback, a selected servo track may then be accessed to obtain a carrier servo signal, which may serve as a feedback signal in a dynamic feedback loop to control the head position. It is recognized that, when a tape is first inserted in a drive, the position of a predetermined head must be accurately determined relative to a designated servo track. Such a determination of a reference position allows that position to be utilized to determine the necessary head repositioning in order to access a different selected servo track, allowing user data to be written or read from the other heads thereby accurately positioned over other designated portions of the tape.

In order to achieve such a determination, the present invention provides a track control/acquisition method for a tape drive where the tape drive includes a multichannel head assembly, a positioner for controllably positioning the multichannel head assembly transversely to a transport path for tape driven by the drive, and drive electronics responsive to a carrier servo signal. The track control/acquisition method first initializes the tape drive by operating the positioner to move the head assembly to a preselected transverse position. Next, the tape is moved along the transport path and the positioner is moved to substantially minimize a feedback signal derived from the carrier servo signal. The head assembly is incrementally moved a first predetermined distance in a first transverse direction until the carrier servo signal is not detected. When the carrier servo signal is not detected, then the positioner is moved so as to move the head assembly a second predetermined distance in a second transverse direction to locate a reference track.

In an alternate embodiment, the method of the invention initializes the tape drive by operating a coarse positioner to move the head assembly so that a designated head is positioned below the bottom of the servo band. The tape is then moved along the transport path and the tape is read to detect the carrier servo signal. The positioner is operated so as to transversely move the head assembly up in increments until the carrier servo signal is detected on an initially located servo track. After the carrier servo signal is detected, a fine positioner is operated to maintain the head assembly centered on the initially located servo track, which is preferably the bottom track.

BRIEF DESCRIPTION OF THE DRAWING

The present invention will be more thoroughly described with reference to the accompanying drawings wherein like numbers refer to like parts in the several views.

DETAILED DESCRIPTION OF THE PREFERRED EMBODIMENT

Figure 1:
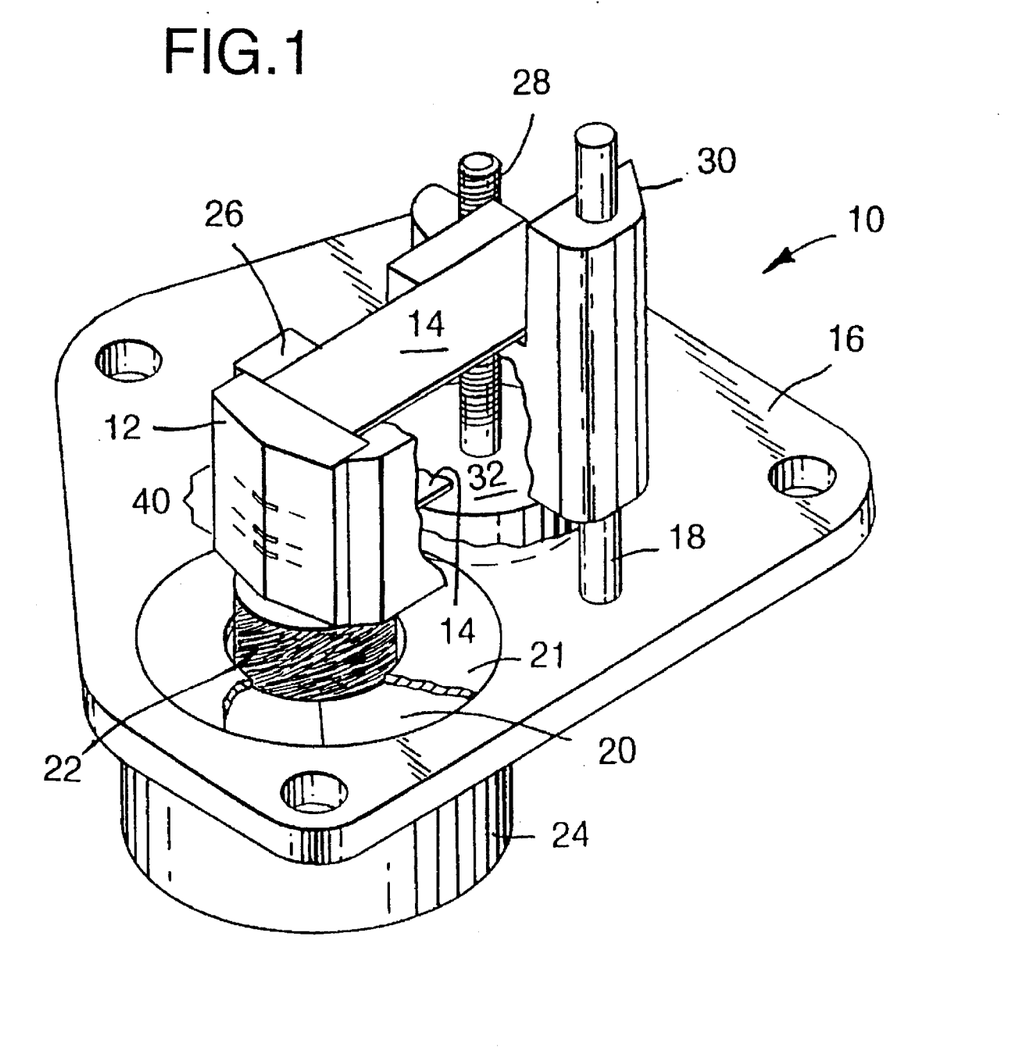
FIG. 1 is an isometric view of one embodiment of a magnetic head positioning assembly employed in one aspect of the method of the present invention.

FIG. 1 shows an isometric view of one embodiment of a magnetic head positioning assembly 10 for a data cartridge tape drive as used in the present invention. As seen therein, the assembly 10 includes a support base 16. A head mounting slide 30 is slideably mounted on a cylindrical shaft 18 extending from the support base 16. A conventional stepper motor 32 is mounted underneath the support base and drives a lead screw 28 which, in turn, moves the head mounting slide 30 in a vertical direction perpendicular to the surface of the support base 16.

The head mounting slide 30 has attached to it first and second cantilevered leaf springs 14 which are arranged parallel to each other and which are vertically spaced apart by a distance appropriate to engage a head mounting member 26. The springs thereby couple the slide 30 to the head mounting member 26 and to a magnetic head assembly mounted thereon, allowing movement in a direction perpendicular to the surface of the support base 16 while minimizing rotation or movement in other directions. The springs 14 are relatively stiff, so that movement of the slide 30 in response to the stepper motor 32 causes the magnetic head assembly 12 to be incrementally moved substantially perpendicularly to the base 16. The magnetic head assembly 12, which includes a plurality of channels of read/write heads, is rigidly mounted to the head mounting member 26. A voice coil 22 is attached at a first end to the head mounting member 26, and is positioned at a second end in a conventional manner within a housing 24 which houses magnet 20. A washer-shaped magnetic shield 21 may advantageously be placed between the magnetic head assembly 12 and the magnet 20.

The magnetic head assembly 12 may advantageously be a multichannel record/read head containing heads 40 positioned to simultaneously access three parallel, longitudinally-extending tracks. The heads for each channel preferably include a write head centrally positioned between two read heads. Depending upon the transverse position of the assembly 12, certain heads operate to read a servo track which is utilized to supply a positioning signal to the magnetic head positioning mechanism, while other heads access tracks containing user data.

Still referring to FIG. 1, in operation the stepper motor 32 is used to coarsely position the head assembly from track to track. The voice coil 22 functions as a fine positioner and responds to a servo signal in a track-following mode, as explained hereinbelow, to make extremely small adjustments as, for example, within micro inches, to follow the center of the selected track. The leaf springs and voice coil design thus allow dynamic control of the position of the head assembly so as to remain centered on a designated track.

Figure 2:
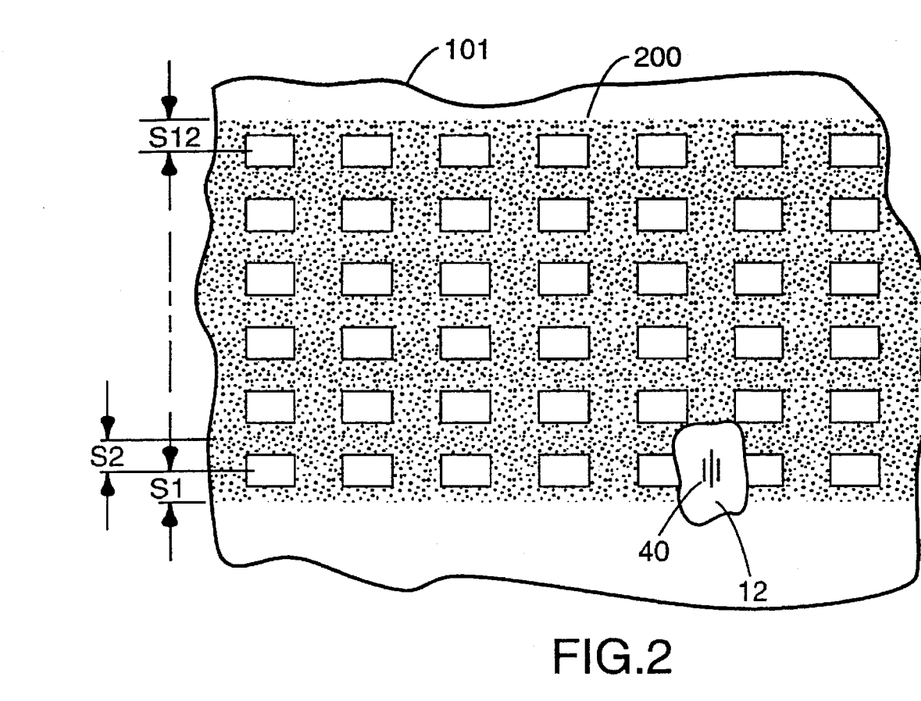
FIGS. 2 and 2a are a schematic diagrams of a portion of a multitrack tape including a track servo pattern employed in one aspect of the invention.
Figure 2A:
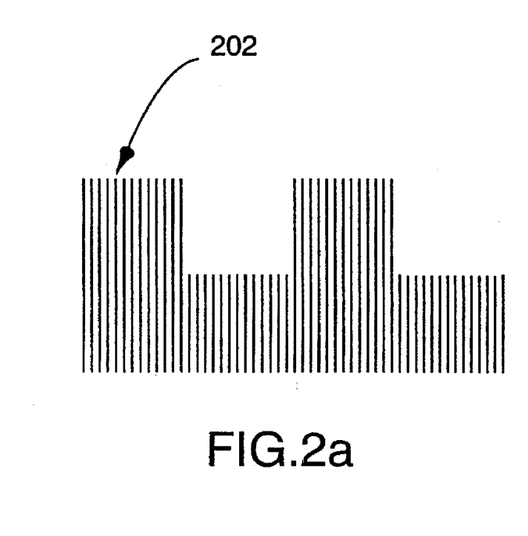

Referring now to FIGS. 2 and 2a, a multi-track tape 101 is shown to have recorded thereon a servo section 200 containing a plurality of discrete, erased blocks within an otherwise continuously recorded region extending along the tape. The transitions transverse to the length of the tape between the erased blocks and recorded area thus define the center lines of a plurality of servo tracks, one of which is shown as the enlarged pattern 202. A magnetic head assembly 12 is also shown positioned over the servo section so that one head 40 is centered over the bottom most servo track S1. The magnetic head assembly 12 extends beyond the transverse limits of the servo section and includes additional heads for recording on and reading from data tracks extending parallel to the servo section. A closed loop servo system described further hereinbelow with reference to FIG. 3 processes signals 202 reproduced from a selected servo track. The servo section 200, in this example, is representative of 12 servo tracks S1–S12. The 12 servo tracks S1–S12 comprise alternating zones of fully recorded and 50 percent erased portions. These portions are played back as a signal which correspondingly alternates between 50% and 100% amplitude when a selected head 40 is centered on the selected servo track.

Figure 3:
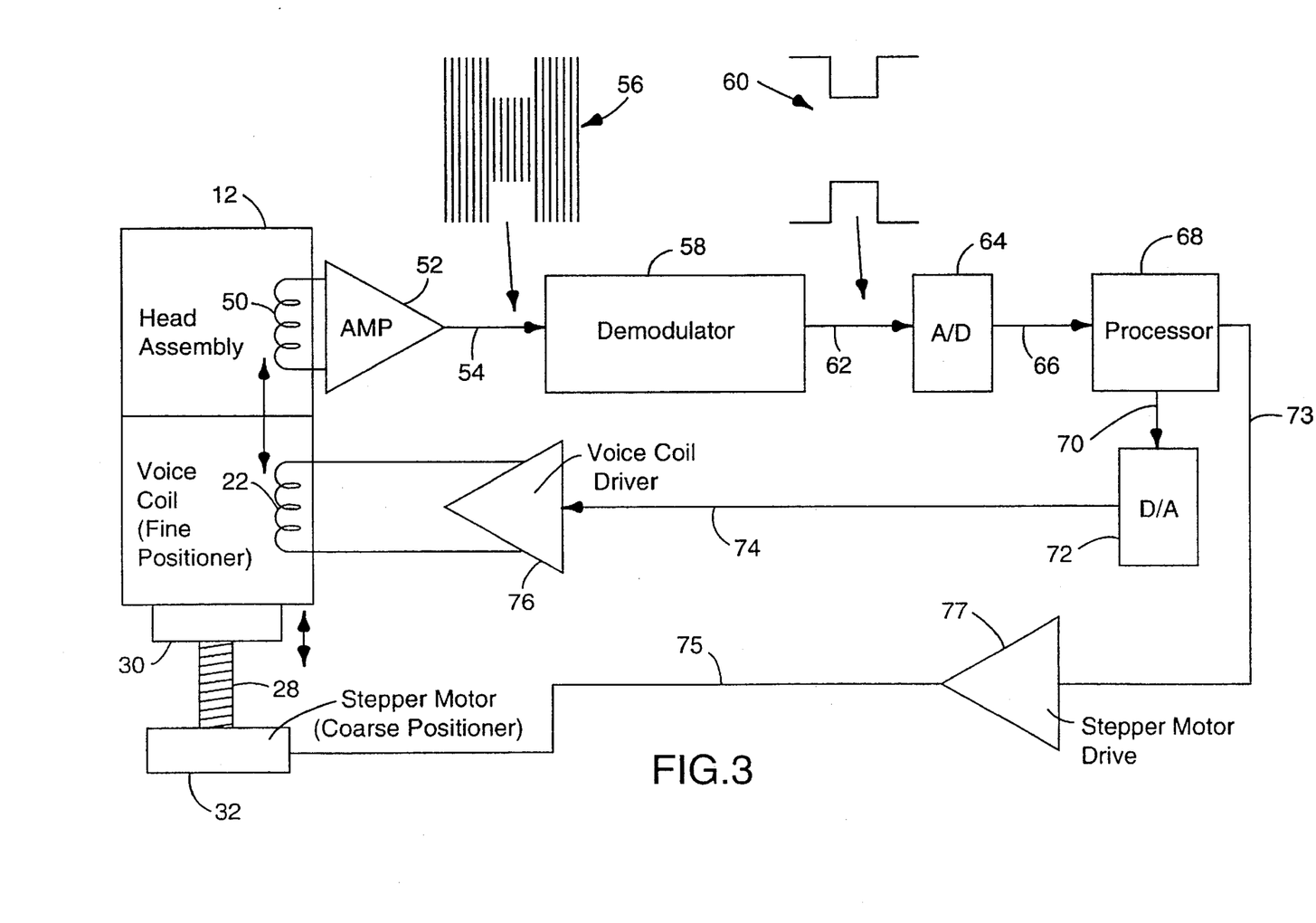
FIG. 3 is a schematic diagram of a closed loop servo system as employed in one embodiment of the invention.

FIG. 3 illustrates schematically a closed loop servo head positioning servo system. With a magnetic head assembly 12 positioned to have a selected head 50 read servo data, as in FIGS. 2 and 2a, the output of that head is coupled to amplifier 52. The output signal of amplifier 52, generally illustrated as waveform signal 56, appears on lead 54. As noted above with reference to FIGS. 2 and 2a, this waveform signal 56 comprises alternating bursts of a full amplitude and a nominally one-half amplitude signal. The output signal as represented in the waveform signal 56 provides servo control.

The waveform signal 56 is processed through a demodulator 58 resulting in a demodulated signal generally illustrated as waveform signal 60 which appears on lead 62. The demodulated signal 60 is then presented to analog-to-digital converter 64 which supplies a corresponding digital signal 66 to digital signal processor 68 in order to provide a fine servo control signal 70 and a coarse servo control signal 73. The fine servo control signal 70 is converted by a digital-to-analog convertor 72 which supplies an analog signal 74 to a voice coil driver 76. The driver drives the voice coil 22 and thereby transversely moves the magnetic head assembly minute amounts, providing fine positioning control. Similarly, the coarse servo control signal 73 is presented to a stepper motor driver 77 which generates a stepper motor control signal 75. The stepper motor 32 is adapted to respond to the stepper motor control signal 75 to rotate the lead screw 28 so as to incrementally move the magnetic head assembly transversely to the direction of tape travel. Typically, the stepper motor will step the head across the tape about 150 microinches/step (3.81 micrometers/step), each track being 1400 microinches (35.6 micrometers) wide, thus providing coarse positioning control. Through the use of these fine and coarse servo signals, the voice coil and the stepper motor may advantageously operate to dynamically reposition the magnetic head assembly 12 to maintain the selected head centered over the center line of the designated servo track.

Upon inspection of the coarse and fine positioning mechanisms shown in FIG. 1, it will be recognized that the coarse positioner, operating via a stepper motor and screw follower, is capable of positioning the head assembly anywhere across the entire width of the tape, whereas the fine positioner has a much more limited range. It may be further recognized upon inspection of the servo signal 56, as shown in FIG. 3, that the signal may have two components, a dynamic component representative of rapidly varying position errors, and a positive or negative DC component representative of long term or static position errors. This DC component is desirably minimized, as it will result in lower currents being required to drive the voice coil, hence less heat buildup. Accordingly, the coarse positioner is desirably activated in response to a component of the played-back servo signal which represents the DC offset to move the head assembly so that the fine positioner is near the center of its range, thereby minimizing the DC offset.

The track servo control system, as described above with reference to FIGS. 1, 2, 2a and 3, is designed to control the position of the magnetic head assembly 12 within a small off-track error limit. In one example, the off-track error is controlled to within ±50 microinches (±1.27 micrometers). Those skilled in the art will recognize that the invention is not limited by the foregoing example, and that finer or coarser control of the off-track error limit may be realized in certain applications.

In a preferred embodiment, the heads associated with each channel in a multichannel head assembly may include a read gap on either side of a centrally positioned write gap, thereby enabling read after write operation while the tape is moving in either forward or reverse direction. For write operation, the two read gaps of a selected channel may be used to read the servo track and to generate the position error signals. The average of the two error signals, one from each gap in the designated servo head channel, may then be used as the position error signal for servoing. For read operation of the cartridge tape drive, only one of the two read gaps of the servo head channel will be used for track servoing, depending on the tape direction.

Figure 4:
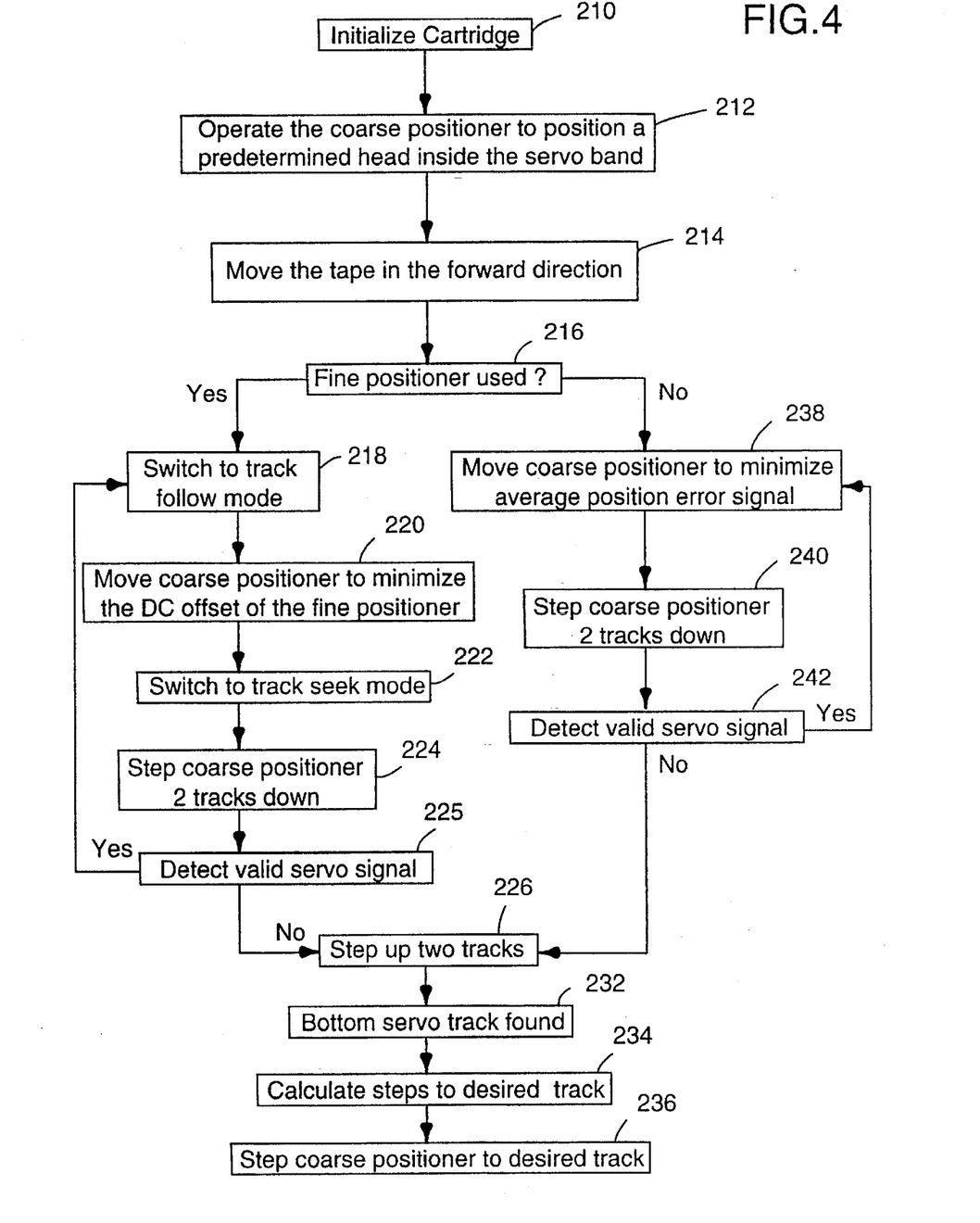
FIG. 4 is a flow diagram of one aspect of the method of the invention for acquiring a servo track using fine and coarse head positioning mechanisms.

Referring now to FIG. 4, a flow diagram of one example of the servo track acquisition method of the invention employing fine and coarse positioning mechanisms is shown. When a tape cartridge is inserted into a data cartridge tape drive at process step 210, the cartridge tape drive executes an initialization routine. The initialization routine may include functions such as cartridge conditioning, gain setting, noise floor checking, identifying the cartridge length and type, etc. After initialization, at process step 212, a predetermined head of the multichannel head assembly is selected to access the servo tracks. The head assembly is then positioned by the coarse positioner so that the selected head is at a fixed physical location at which the middle of the servo section will generally lie. The predetermined head may advantageously correspond to, for example, the top head, bottom head, or another convenient head of the multichannel magnetic head. At process step 214, the cartridge drive runs the tape in the forward direction.

At step 216, a determination is made as to whether or not a fine positioner is in use. If a fine positioner is being used, the process proceeds to step 218. Otherwise, the process is routed to step 238. At step 218, the cartridge tape drive switches to a track-follow mode. The track-follow mode may be used for a tape format greater than 2 gigabytes, where servo signal tracks, such as the servo pattern 200 of FIG. 2, are pre-recorded on a tape. In the track-follow mode, the drive must be running at steady state speed.

At step 220, the coarse positioner steps the head so as to maintain a position on the servo track which minimizes the DC offset of the fine positioner. The cartridge tape drive then switches to a track-seek mode at step 222 where the drive electronics steps the stepper motor a number of desired steps and proceeds to step 224 to step the head down two tracks using the coarse positioner. The drive seeks a servo carrier signal at step 225. If detected, a servo carrier signal indicates that the bottom of the servo band may not have been found and the process is repeated from step 218. The lack of a servo carrier signal indicates that the head is below the servo band and that the head must be stepped up. In the absence of a servo carrier signal, the drive steps the head up two tracks at step 226 to find the bottom track of the servo band.

In the case where no fine positioner is employed by the cartridge drive, the method of the invention branches from step 216 to step 238. The position error signal is then used at step 238 to cause the head assembly to be moved to minimize the position error signal. While the position error signal is at a minimum, the track-seek mode is again implemented at step 240 to step the coarse positioner down two tracks.

At step 242, the head searches for a carrier servo signal which indicates that a valid servo signal is present. If a carrier servo signal is found, the routine returns to step 238 and repeats the intermediate steps. If no servo signal is found, the coarse positioner is used to step up the head two tracks at step 226 and, as a result, the head will be positioned on the bottom track as at step 232.

Once a reference track, in this example the bottom track, has been located as at step 232, the magnetic head assembly may be positioned to any desired track. At process step 234, the number of steps required to move a selected read gap to the desired track is calculated. At step 236, the coarse positioner is engaged to move the multichannel head so as to move a selected read gap onto the desired track. If available, fine positioning may then be advantageously used to assure accuracy of the head position.

Figure 5:
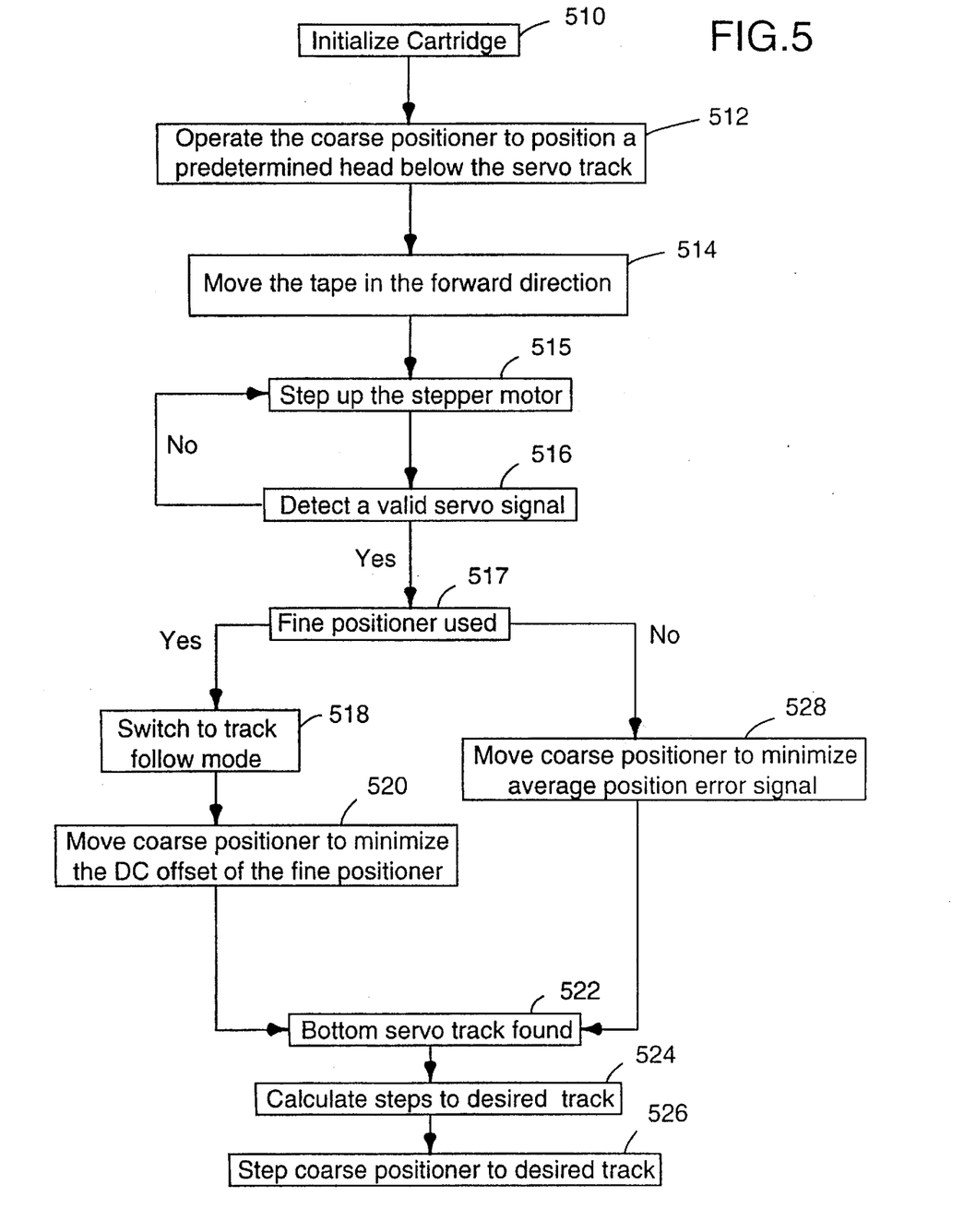
FIG. 5 is a flow diagram of an alternate aspect of the method of the invention for acquiring a servo track using fine and coarse head positioning mechanisms.

Referring now to FIG. 5, an alternate method of the invention is shown in flow diagram form. At step 510, the data cartridge tape drive initializes the cartridge, as described hereinabove with reference to FIG. 4. At step 512 the drive positions a predetermined head a predetermined distance below the bottom servo track by moving the head assembly with the coarse positioner. In one example, the predetermined head is located approximately 10 mils (0.0254 cm) below the bottom servo track. For example, the coarse positioner may comprise a stepper motor. At step 514, the tape is moved in the forward direction. Then the coarse positioner steps the head in one or more step increments at step 515. At step 516, the head searches for a carrier servo signal which indicates that a valid servo signal is present. The process repeats steps 515 and 516 until a carrier servo signal is detected.

At step 517, a determination is made as to whether or not a fine positioner is in use. If a fine positioner is being used, the process proceeds to step 518. Otherwise, the process is routed to step 528. The data cartridge tape drive switches to a track-follow mode at step 518. At step 520, the coarse positioner moves the head so as to maintain a position on the servo track which minimizes the DC offset of the fine positioner which indicates that the head is at center of the servo track within the specified error limit. At this point, the reference servo track is found. The bottom servo track may advantageously be selected as the reference track as in step 522, but any convenient reference may be used. As discussed hereinabove with respect to FIG. 4, once the reference track is found, the number of steps to any other desired track may be calculated at step 524, and the coarse positioner may move the head the calculated number of steps at process step 526.

The above examples illustrated with respect to FIGS. 4 and 5 assume searching is being done on even tracks. By convention, this entails moving the tape in a forward direction. If one desires to search on odd numbered tracks, the steps requiring movement of the tape in a forward direction must be changed to move the tape in the opposite direction accordingly.

Those skilled in the art will appreciate that locating the top servo track may be accomplished in a similar manner. This may require moving the tape in the reverse direction instead of the forward direction, or stepping the coarse postioner in the up position instead of the down position.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A track control method for a data cartridge tape drive wherein the data cartridge tape drive includes a multichannel head assembly, a positioner for controllably positioning the multichannel head assembly transversely to a transport path for a tape driven by the drive, and drive electronics responsive to a carrier servo signal reproduced from a servo track within a servo section previously recorded on a said tape, the track control method comprising the steps of:

a. initializing the data cartridge tape drive by operating the positioner to move the head assembly to a preselected transverse position at which a head thereof is at least within said servo section;

b. moving the tape along said transport path;

c. moving the positioner to substantially minimize a feedback signal derived from the carrier servo signal;

d. moving the head assembly a first predetermined distance in a first transverse direction until the carrier servo signal is not detected, otherwise repeating steps c. and d.; and e. when the carrier servo signal is not detected moving the positioner so as to move the head assembly a second predetermined distance in a second transverse direction so as to locate a reference track.

2. The track control method of claim 1, wherein the positioner includes a fine positioner and a coarse positioner, wherein the fine positioner has a DC offset, and wherein the step of moving the positioner to substantially minimize a feedback signal further comprises the steps of:

a. reading the tape to detect the carrier servo signal;

b. switching to a track follow mode in which said fine positioner is used to control the head assembly position;

c. moving the coarse positioner to minimize the DC offset signal of the fine positioner; and d. switching to a track seek mode in which the coarse positioner controls the head assembly position.

3. The track control method of claim 2 further comprising the steps of:

a. calculating a specific distance from the reference track to a target track; and b. moving the head assembly said specific distance to the target track.

4. The track control method of claim 1 wherein the step of moving the positioner to substantially minimize a feedback signal further comprises the steps of:

a. detecting an average position error signal after the carrier servo signal is detected; and b. operating the positioner to move the head assembly to minimize the average position error signal.

5. The track control method of claim 4 further comprising the steps of:

a. calculating a specific distance from the reference track to a target track; and b. moving the head assembly said specific distance to the target track.

6. The track control method of claim 1 further comprising the steps of:

a. calculating a specific distance from the reference track to a target track; and b. moving the head assembly said specific distance to the target track.

7. A track control method for a tape drive for a tape containing a plurality of servo tracks within a servo section, wherein the tape drive includes a multichannel head assembly, a positioner for controllably positioning the multichannel head assembly transversely to a transport path for a tape driven by the drive, and drive electronics responsive to a carrier servo signal reproduced from one of said servo tracks, the track control method comprising the steps of:

a. initializing the tape drive by operating the positioner to move the head assembly to a preselected transverse position inside the servo section;

b. moving the tape along said transport path;

c. determining whether the positioner includes a fine positioner;

d. if the positioner includes a fine positioner in use with a coarse positioner then:

i. reading the tape to detect the carrier servo signal;

ii. switching to a track follow mode in which said fine positioner is used to control the head assembly position;

iii. moving the coarse positioner to minimize the DC offset signal of the fine positioner; and iv. switching to a track seek mode in which the coarse positioner controls the head assembly position;

v. moving the head assembly a first predetermined distance in a first transverse direction until the carrier servo signal is not detected, otherwise repeating steps d.i through d.v;

e. if a fine positioner is not in use then:

i. detecting an average position error signal after the carrier servo signal is detected; and ii. operating the positioner to move the head assembly to minimize the average position error signal; and f. when the carrier servo signal is not detected, then moving the positioner so as to move the head assembly a second predetermined distance in a second transverse direction so as to locate a reference track.

8. The track control method of claim 7 further comprising the steps of:

a. calculating a specific distance from the reference track to a target track; and b. moving the head assembly said specific distance to the target track.

9. A track control method for a data cartridge tape drive for tape including a plurality of servo tracks within a servo section, wherein the data cartridge tape drive includes a multichannel head assembly, a positioner for controllably positioning the multichannel head assembly transversely to a transport path for a tape driven by the drive, and drive electronics responsive to a carrier servo signal reproduced from one of said servo tracks, the track control method comprising the steps of:

a. initializing the data cartridge tape drive by operating the coarse positioner to move the head assembly to below the bottom of the servo section;

b. moving the tape along said transport path;

c. reading the tape to detect the carrier servo signal;

d. operating the positioner so as to transversely move the head assembly up in increments until the carrier servo signal is detected on an initially located servo track;

e. if the positioner includes a fine positioner in use with a coarse positioner, where the drive electronics also provides a DC offset signal representative of an offset location of the fine positioner in relation to a servo track, then:

i. switching to a track follow mode by reading the tape to detect the carrier servo signal;

ii. moving the coarse positioner to minimize the DC offset signal of the fine positioner; and f. if a fine positioner is not in use then:

i. detecting an average position error signal after the carrier servo signal is detected; and ii. operating the positioner to move the head assembly to minimize the average position error signal.

10. The track control method of claim 9 further comprising the steps of:

a. calculating a specific distance from the reference track to a target track; and
b. moving the head assembly said specific distance to the target track.

11. A track control method for a data cartridge tape drive wherein the data cartridge tape drive includes a multichannel head assembly, a positioner for controllably positioning the multichannel head assembly transversely to a transport path for a tape driven by the drive, and a control circuit responsive to a servo signal reproduced from a servo track, the tape comprising a servo section having a pattern previously recorded thereon representing a plurality of parallel servo tracks, and a plurality of data tracks extending parallel to the servo section, the track control method comprising the steps of:

a. initializing the data cartridge tape drive by operating the positioner to move the head assembly to a preselected transverse physical position within the servo section;
b. transporting the tape and reading the servo signal at the current position;
c. transversely moving the positioner to substantially minimize a servo position error signal derived from the read servo;
d. moving the head assembly a first predetermined distance in a first transverse direction and detecting the presence or absence of a servo;
e. when a valid servo signal is detected, then repeating steps c. and d.; and
f. when a valid servo signal is not detected, moving the positioner so as to move the head assembly a second predetermined distance in a second transverse direction so as to locate a reference servo track.

12. The track control method of claim 11, further comprising determining whether the positioner includes a fine positioner; and a. if the positioner includes a fine positioner, steps c. and d. comprise:
  i. switching to a track follow mode in which said fine positioner is used to control the head assembly position;
  ii. moving the coarse positioner to minimize the DC offset signal of the fine positioner;
  iii. switching to a track seek mode in which a coarse positioner controls the head assembly position;
  iv. stepping the head assembly by the coarse positioner by a first predetermined distance in a first transverse direction until the carrier servo signal is not detected, otherwise repeating steps i. through iv.;
b: if a fine positioner is not in use, steps c. and d. comprise:
  i. detecting an average position error signal after the servo signal is detected; and
  ii. operating the coarse positioner to move the head assembly to minimize the average positioner error signal.

13. The track control method of any of claims 11, further comprising the steps of:

g. calculating a specific distance from the reference track to a target track; and
h. stepping the head assembly said specific distance to the target track.

* * * * *